US012702080B2

(12) United States Patent
Hilvers et al.

(10) Patent No.: US 12,702,080 B2
(45) Date of Patent: Aug. 11, 2026

(54) HEADER TRANSPORT WITH STEERABLE WALKING TANDEM AXLES

(71) Applicant: Unverferth Manufacturing Company, Inc., Kalida, OH (US)

(72) Inventors: Michael J. Hilvers, Kalida, OH (US); Shawn Gerdeman, Kalida, OH (US); Joshua J. Inkrott, Kalida, OH (US)

(73) Assignee: UNVERFERTH MANUFACTURING CO., INC., Kalida, OH (US)

(*) Notice: Subject to any disclaimer, the term of this patent is extended or adjusted under 35 U.S.C. 154(b) by 943 days.

(21) Appl. No.: 17/818,862

(22) Filed: Aug. 10, 2022

(65) Prior Publication Data

US 2023/0050768 A1 Feb. 16, 2023

Related U.S. Application Data

(60) Provisional application No. 63/231,827, filed on Aug. 11, 2021.

(51) Int. Cl.
*A01B 69/00* (2006.01)
*A01B 69/08* (2006.01)
*A01D 75/00* (2006.01)

(52) U.S. Cl.
CPC .......... *A01B 69/006* (2013.01); *A01D 75/002* (2013.01)

(58) Field of Classification Search
CPC . B60G 2200/44; B60G 2300/04; B60P 3/066; A01B 69/00; A01B 69/003; A01B 69/006; A01D 73/00; A01D 73/005; A01D 75/00; A01D 75/004; A01D 75/002
See application file for complete search history.

(56) References Cited

U.S. PATENT DOCUMENTS 3,529,848 A * 9/1970 Harvey .................. B62D 13/04 280/445
3,883,158 A * 5/1975 Fikse ........................ B60P 3/40 280/426
3,910,436 A * 10/1975 Machan ................. B62D 63/06 280/43.11
3,930,669 A * 1/1976 Kollander ............. B62D 13/04 280/426
5,477,937 A * 12/1995 Chagnon ................ B62D 7/144 280/81.6
5,975,829 A * 11/1999 Walters ................ A01B 73/005 14/71.1
6,131,691 A * 10/2000 Morch .................. B62D 13/00 280/445
6,135,484 A * 10/2000 Lauronen ............... B62D 13/02 280/445

(Continued)

FOREIGN PATENT DOCUMENTS

EP 2777962 A1 * 9/2014 ............. B60G 5/053
EP 3669626 B1 * 8/2021 ........... A01D 75/002

*Primary Examiner* — Adam J Behrens
(74) *Attorney, Agent, or Firm* — ROTHWELL, FIGG, ERNST & MANBECK, P.C.

(57) ABSTRACT

A header transport steering system is provided that allows the tongue of the header transport to pivot and translates the movement of the tongue to all of the wheels of the header transport. Front steering linkages are coupled to the tongue, and are configured to oscillate front wheels in response to rotation of the tongue. Walking tandem beams are connected to the frame and are configured to rotate in height with respect to the frame.

15 Claims, 10 Drawing Sheets

(56) References Cited

U.S. PATENT DOCUMENTS

| | | | | |
|---|---|---|---|---|
| 6,488,114 | B1 * | 12/2002 | McMahon | B60G 9/022 180/419 |
| 6,619,680 | B2 * | 9/2003 | Platteeuw | B62D 13/04 280/100 |
| 7,810,823 | B2 * | 10/2010 | Van Mill | A01B 69/003 280/81.6 |
| 7,874,571 | B2 * | 1/2011 | Frey | B60G 3/14 280/445 |
| 7,926,833 | B2 * | 4/2011 | Hellbusch | B62D 13/02 280/91.1 |
| 8,600,620 | B2 * | 12/2013 | Noel | B62D 7/06 180/416 |
| 8,870,210 | B2 * | 10/2014 | Smith | A01B 69/006 280/426 |
| 9,085,322 | B2 * | 7/2015 | Olsen | B62D 13/04 |
| 9,187,024 | B2 * | 11/2015 | Bojsen | A01D 75/002 |
| 10,351,172 | B2 * | 7/2019 | Dumalski | B60G 5/02 |
| 10,457,324 | B1 * | 10/2019 | Hellbusch | B62D 13/04 |
| 10,668,949 | B1 * | 6/2020 | Hellbusch | B62D 7/142 |
| 10,980,181 | B2 * | 4/2021 | Sudbrack | B60P 3/066 |
| 2005/0077703 | A1 * | 4/2005 | Tango | B62D 13/04 280/442 |
| 2005/0121878 | A1 * | 6/2005 | Muldoon | F15B 7/10 280/426 |
| 2011/0079487 | A1 * | 4/2011 | Toews | A01D 75/008 198/304 |
| 2012/0217723 | A1 * | 8/2012 | Smith | B62D 13/04 56/228 |
| 2015/0091274 | A1 * | 4/2015 | Bojsen | B62D 13/02 280/100 |
| 2017/0050691 | A1 * | 2/2017 | Guerin | A01B 51/04 |
| 2020/0120873 | A1 * | 4/2020 | Sudbrack | B60P 3/066 |

* cited by examiner 653
803
654
813
129
703
804
814
605
704
810
106
616
809
882
811
701
801
604
702
812
128
802
651
114
652

HEADER TRANSPORT WITH STEERABLE WALKING TANDEM AXLES

CROSS REFERENCE TO RELATED APPLICATION

The present application claims priority to U.S. Provisional Application No. 63/231,827 filed on Aug. 11, 2021, the disclosure of which is incorporated in its entirety by reference herein.

FIELD OF THE INVENTION

The present invention relates generally to a header transport steering system. More particularly, the present invention relates to a header transport with steerable walking tandem axles.

BACKGROUND

Towed farm implements can be difficult to turn at a sharp angle. For example, header transports generally include a tongue that can be coupled to a towing vehicle (e.g., a tractor) that pulls the header transport. Steering systems for towed farm implements exist in which the tongue of the wagon is pivoted as it is pulled, and the angle at which the tongue pivots is translated to the wheels. The limited range of movement makes it hard to maneuver during towing. Further, the limited range of movement causes the front tires to slide sideways during constricted maneuvers, which results in tire damage and puts undue stress on the transporter frame and joints.

Header transport steering systems are known in the art, including for example, U.S. Pat. No. 8,870,210, which is incorporated by reference herein. While header transport steering systems are known in the art, the inventors of the subject application have developed improved header transport systems offering several benefits and improvements as discussed in greater detail herein. Thus, there is a need for a new and improved steering system for towed form implements, such as header transports.

SUMMARY

The present invention relates to a header transport with steerable walking tandem axles. The header transport steering system of the present invention can provide numerous advantages over existing header transport steering systems. For example, the header transport steering system can have a high load capacity to handle the ever-increasing weight of combine headers. The header transport steering system can have the flexibility to handle uneven terrain. Additionally, the header transport steering system can have steering control of all wheels to increase maneuverability of the unit.

In certain embodiments, the header transport steering system provides steering for all wheels via mechanical linkage from the tow hitch. The header transport steering system can thus eliminate the need for special tow equipment or manual control of the rear steering functions. In preferred embodiments, the header transport steering system includes at least two steerable walking tandem axles. In certain embodiments, the header transport system includes at least one steerable walking tandem axle located on the left side and at least one located on the right side of the header transport. In certain embodiments, the header transport system includes one steerable walking tandem axle located on the rear left side and one located on the rear right side of the header transport. In certain embodiments, the header transport system further includes one steerable walking tandem axle located on the front left side and one located on the front right side of the header transport. The header transport steering system provides for independent oscillation of each of the walking tandem beams. The header transport steering system can allow all wheels of the header transport system to maintain constant contact with the ground providing for maximum load-bearing capability. A front-to-rear connecting link connects the front linkages to the rear linkages so that the rear wheels can turn in the opposite direction of the front wheels, which can provide for tighter turning.

According to an embodiment of the present invention, a header transport steering system is provided. The header transport steering system includes a frame comprising a front support beam and a rear support beam. The header transport steering system includes a tongue pivotably coupled to the front support beam of the frame such that the tongue is capable of rotating about a coupling. In certain embodiments, the tongue is capable of rotating about the coupling approximately 180 degrees. The header transport steering system further includes a plurality of front wheels and rear wheels pivotably coupled with the frame. The header transport steering system includes a front steering linkage coupled to the tongue and configured to oscillate the front wheels of the plurality of wheels in response to rotation of the tongue. The header transport steering system includes a plurality of walking tandem beams. In certain embodiments, the header transport system includes one steerable walking tandem axle located on the rear left side and one located on the rear right side of the header transport. In certain embodiments, the header transport system further includes one steerable walking tandem axle located on the front left side and one located on the front right side of the header transport. Further, the header transport steering system includes a front-to-rear linkage coupled to the front steering linkage and the rear support beam. The header transport steering system further includes a plurality of connecting links are coupled to each of said walking tandem beams, wherein each connecting link is configured to rotate in relation to said walking tandem beam.

According to an embodiment of the present invention, each walking tandem beam is configured to rotate independently of said front or rear support beam.

According to an embodiment of the present invention, each connecting link is configured to rotate independently in relation to said walking tandem beam.

According to an embodiment of the present invention, the invention contains two front wheels. In certain embodiments, the header transport steering system includes four rear wheels and two walking tandem beams. A first rear wheel and a second rear wheel of said four rear wheels can be connected to a first walking tandem beam, and a third rear wheel and a fourth rear wheel of the four rear wheels can be connected to a second walking tandem beam.

According to an embodiment of the present invention, the header transport steering system contains a first rear axle connecting the first rear wheel to the first walking tandem beam. The header transport steering system also contains a second rear axle connecting the second wheel to the first walking tandem beam. A third rear axle connects the third rear wheel to the second walking tandem beam. Further, a fourth rear axle connecting the fourth rear wheel to the second walking tandem beam.

According to an embodiment of the present invention, the plurality of rear connecting links consist of a first, second, third, and fourth rear connecting link. The first rear connecting link connects the first rear axle to a first rear coupling. The second rear connecting link connects the second rear axle to the first rear coupling. The third rear connecting link connects the third rear axle to a second rear coupling, and the fourth rear connecting link connects the fourth rear axle to the second rear coupling. In certain embodiments, a first rear center link connects the rear coupling to the rear support beam, and a second rear center link connects the second rear coupling to the rear support beam.

According to an embodiment of the present invention, the plurality of walking tandem beams rotate about a generally horizontal axis of rotation in relation to the rear support beams. The rotation of said plurality of walking tandem beams can result in a change in height of the rear wheels.

According to an embodiment of the present invention, the plurality of rear connecting links rotate about a generally vertical axis of rotation in relation to the walking tandem beams. The rotation of the rear connecting links can result in the rotation of the rear tires.

According to an embodiment of the present invention, the front-to-rear linkage is configured to oscillate the rear wheels in an opposite direction of the front wheels.

According to an embodiment of the present invention, the walking tandem beams are coupled to the rear beam support at a location closer to the rear of the walking tandem beam relative to a center of gravity of the walking tandem beam.

According to an embodiment of the present invention, a header transport steering system includes a frame comprising a front support beam and a rear support beam. The header transport system comprises a plurality of front walking tandem beams coupled to the front support beam and configured to rotate in relation to the front support beam. The header transport system further comprises a plurality of front wheels coupled to the front walking tandem beams. The header transport system further includes a plurality of rear walking tandem beams coupled to the rear support beam and configured to rotate in relation to the rear support beam. The header transport system further includes a plurality of rear wheels coupled to the front walking tandem beams. The header transport system further includes a front-to-rear linkage coupling the front support beam to the rear support beam.

In certain embodiments, the header transport steering system comprises a plurality of connecting links. Each connecting link is coupled to at least one of said walking tandem beams, and the connecting links are configured to rotate in relation to said walking tandem beam. In certain embodiments, each connecting link is configured to rotate independently in relation to the walking tandem beam to which it is connected. In certain embodiments, each front walking tandem beam is configured to rotate independently in relation to the front support beam, and each rear walking tandem beam is configured to rotate independently in relation to the rear support beam.

In certain embodiments, the header transport system comprises four walking tandem beams and eight wheels. The header transport system can include two front walking tandem beams each connected to two front wheels. The header transport system can include two rear front walking tandem beams each connected to two rear wheels. The front walking tandem beams can rotate about a generally horizontal axis of rotation in relation to the front support beam. Similarly, the rear walking tandem beams can rotate about a generally horizontal axis of rotation in relation to the rear support beam. The rotation of the front walking tandem beams can result in a change in height of the front wheels, and the rotation of the rear walking tandem beams can result in a change in height of the rear wheels.

In certain embodiments, the front walking tandem beams are coupled to the front beam support at a location closer to the rear of the front walking tandem beams relative to a center of gravity of the front walking tandem beam. Similarly, in certain embodiments, the rear walking tandem beams are coupled to the rear beam support at a location closer to the rear of the rear walking tandem beams relative to a center of gravity of the rear walking tandem beam.

The above and/or other aspects, features and/or advantages of various embodiments will be further appreciated in view of the following description in conjunction with the accompanying figures. Various embodiments can include or exclude different aspects, features or advantages where applicable. In addition, various embodiments can combine one or more aspects, features, or advantages where applicable. The descriptions of the aspects, features, or advantages of a particular embodiment should not be construed as limiting any other embodiment of the claimed invention.

BRIEF SUMMARY OF THE DRAWINGS

The accompanying drawings, which are incorporated herein and form part of the disclosure, help illustrate various embodiments of the present invention and, together with the description further serve to describe the invention to enable a person skilled in the pertinent art to make and use the embodiments disclosed herein.

DETAILED DESCRIPTION OF THE DRAWINGS

Figure 1:
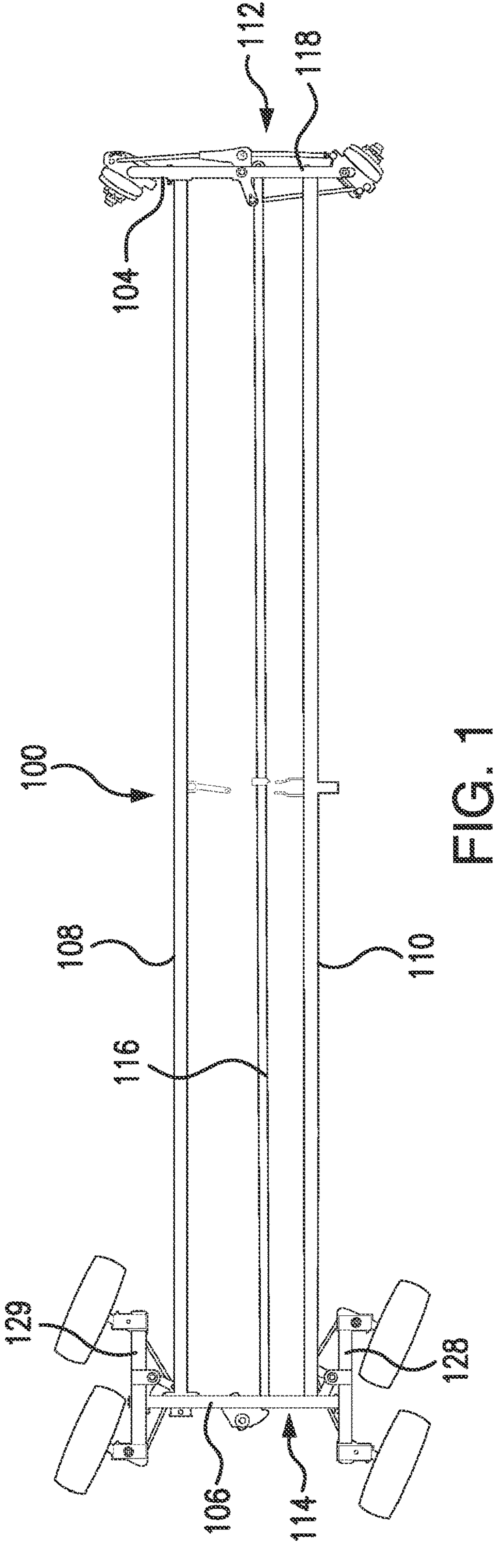
FIG. 1 is a top view of a header transport according to an embodiment of the present invention.

While the present invention may be embodied in many different forms, a number of illustrative embodiments are described herein with the understanding that the present disclosure is to be considered as providing examples of the principles of the invention and such examples are not intended to limit the invention to the preferred embodiment described herein and/or illustrated herein.

The present invention relates to a header transport with steerable walking tandem axles. The header transport steering system of the present invention can provide numerous advantages over existing header transport steering systems. For example, the header transport steering system can have a high load capacity to handle the ever-increasing weight of combine headers. In certain embodiments, the header transport steering system can have a low height to allow for easy mounting and removal of the combine header. The maximum tire diameter is limited on a header transport, and the header transport can have a low profile in order for the headers to raise over the entire header transport. Tire capacity typically correlates with tire diameter, and thus, in order to gain capacity without increasing tire diameter, the header transport can include additional tires to increase capacity. The header transport steering system can have the flexibility to handle uneven terrain. Additionally, the header transport steering system can have steering control of all wheels to increase maneuverability of the unit by decreasing turning radius.

In certain embodiments, the header transport steering system provides steering for all wheels via mechanical linkage from the tow hitch. The header transport steering system can thus eliminate the need for special tow equipment or manual control of the rear steering functions. The header transport steering system can have two or more steerable walking tandem axles. In certain embodiments, the header transport steering system includes at least two steerable walking tandem axles with one located on the left side and a second located on the right side of the header transport. In certain embodiments, the header transport system includes a pair of walking tandem axles located on the front of the device and a pair of walking tandem axles located on the rear of the device. The front of the device is in reference to the direction of travel of the device. The header transport steering system provides for independent oscillation (rotation) of each of the walking tandem beams. The header transport steering system can allow all wheels of the header transport system to maintain constant contact with the ground providing for maximum load-bearing capability.

In certain embodiments, the header transport system includes a front and a rear support beam. In certain embodiments, a pair of walking tandem beams can be connected to the front and/or rear support beams. The walking tandem beams can oscillate relative to the front or rear support beam about a pivot point. In certain embodiments, the pivot point for oscillation of these beams is favored, but not limited, toward the rear of the rockers, delivering a slightly higher weight to the rear wheel. This gives the rocker pair greater flotation when moving forward over soft ground, as the leading wheel will tend to rise over the terrain, instead of sinking into it.

In certain embodiments, the rear axle is controlled by a front-to-rear connecting link, which connects to a pivot point centralized on the rear support beam. The front-to-rear connecting link connects the front linkages to the rear linkages so that the rear wheels can turn in the opposite direction of the front wheels, which can provide for tighter turning. Connecting links from the pivot point on the rear support beam connect to a second pivot point on each walking tandem beam, which distributes the steering force to the respective wheels. The geometry of these pivots are placed so that the oscillating motion of the walking tandem beams have a negligible effect on the wheel angles. These and other features allow the relationship with the front axle and wheels to be maintained. For example, and without limitation, turning in the opposite direction at a specific ratio, creating tighter turns with appropriate trailing to create minimal path width.

In an embodiment of the present invention, a header transport steering system for a towed farm implement or wagon, such as a header transport, is provided that allows the tongue of the header transport to pivot. In certain embodiments, the header transport steering system can pivot approximately 90 degrees to the right or the left (i.e., 180 degrees in total) and translates the movement of the tongue to all of the wheels of the header transport.

Figure 2:
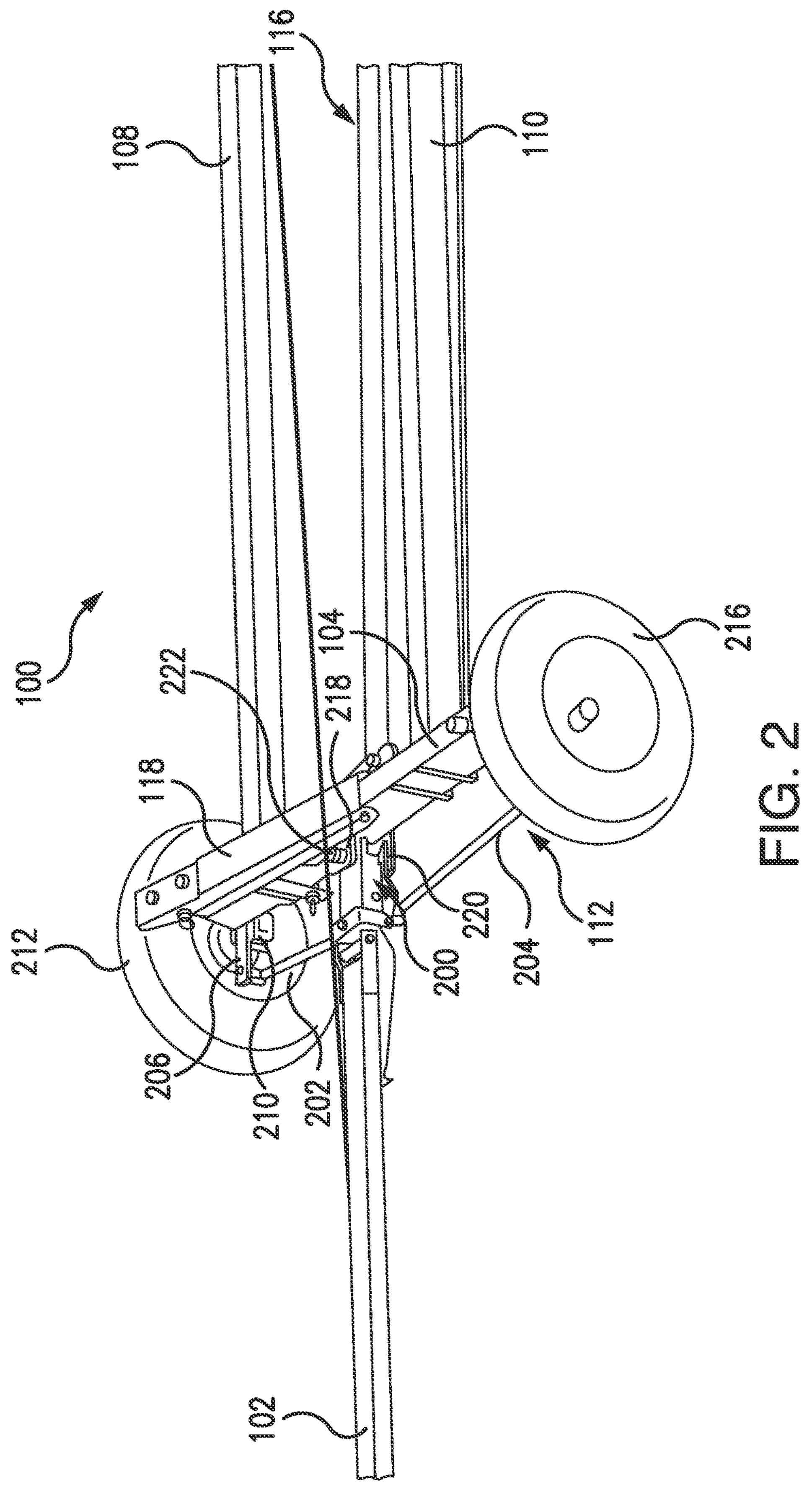
FIG. 2 is a perspective view of the front steering linkage of a header transport according to an embodiment of the present invention.

FIG. 1 is a top view of a header transport with an all-wheel 180-degree steering system according to an embodiment of the present invention. The header transport 100 includes a support frame formed by a front support beam 104, a rear support beam 106 and side support beams 108 and 110. The frame beams can be connected by connecting means such as, for example, by bolts or welding. The header transport is a multi-wheel transport and wheels can be provided, for example, at the ends of beams—e.g., front support beam 104. The plurality of wheels are turnable and can be rotatably coupled to the frame. The header transport includes a front steering linkage 112, a rear steering linkage 114 and a front-to-rear connecting link 116. As illustrated in FIG. 2, a tongue 102 is pivotably coupled to the front support beam 104. In an embodiment, the linkages are mechanically coupled with the tongue 102 so that movement of the tongue 102 controls the oscillation (rotation) of the wheels of the header transport. The header transport includes a rear support beam 106 connected to two walking tandem beams 128 and 129. Each walking tandem beam 128, 129 is connected to two wheels.

In an embodiment of the present invention, the header transport 100 includes a front rest bracket 118. The front rest bracket 118 is coupled to the front support beam 104. The rest bracket 118 is configured to support a large object to be transported, such as a header or grain platform. In an embodiment of the present invention, front rest bracket 118 can be adjustable such that the angle of the rest bracket 118 relative to the support beam to which it is coupled can be changed. A rear rest bracket may be added to the rear support beam 106 in a manner allowing the rear rest bracket to have similar functionality as the front rest bracket 118.

FIG. 2 illustrates the front steering linkage 112 of a header transport steering system according to an embodiment of the present invention. The front steering linkage 112 is adapted to translate the movement of the tongue 102 to the front wheels 212 and 216 such that, as the tongue 102 is pivoted left or right, the front wheels oscillate in the direction that the tongue is being pivoted. In an embodiment, the front wheels rotate 180 degrees.

As shown, in the neutral position, the tongue 102 is disposed approximately perpendicular to the front face of the front support beam 104. The tongue 102 can be pivotably connected to the front support beam 104 at joint 200. The tongue 102 is capable of rotating 180 degrees about the joint 200. The front steering linkage 112 can include a front right link 202, a front left link 204, a front right wheel coupling 206 and a front left wheel coupling 208 (See FIG. 4). The front right link 202 and the front left link 204 can be pivotably coupled to the tongue 102 on one end and the wheels 212 and 216 on the other end. Thus, as the tongue 102 is rotated about the joint 200, the front right link 202 and the front left link 204 are pushed or pulled by the movement of the tongue 102, thereby, turning wheels 212 and 216.

Wheel couplings 206 and 208 (See FIGS. 3 and 4) can be provided. The front right link 202 can be connected to the front right wheel coupling 206. The front right wheel coupling 206 can be rotatably coupled to the front support beam 104. The front left link 204 can be connected to the front left wheel coupling 208. The front left wheel coupling 208 can be rotatably coupled to the front support beam 104. The front right wheel coupling 206 can be coupled to the axle 210 (See FIG. 3) of the front right wheel 212. The front left wheel coupling 208 can be coupled to the axle 214 (See FIG. 4) of the front left wheel 216.

In an embodiment of the present invention, the front support beam 104 includes an extension 218 to accommodate joint 200. The joint 200 can include a pin 222. The tongue 102 can be pivotably connected to the front support beam 104 by a pin 222 that passes through the extension 218 and the tongue 102.

Figure 3:
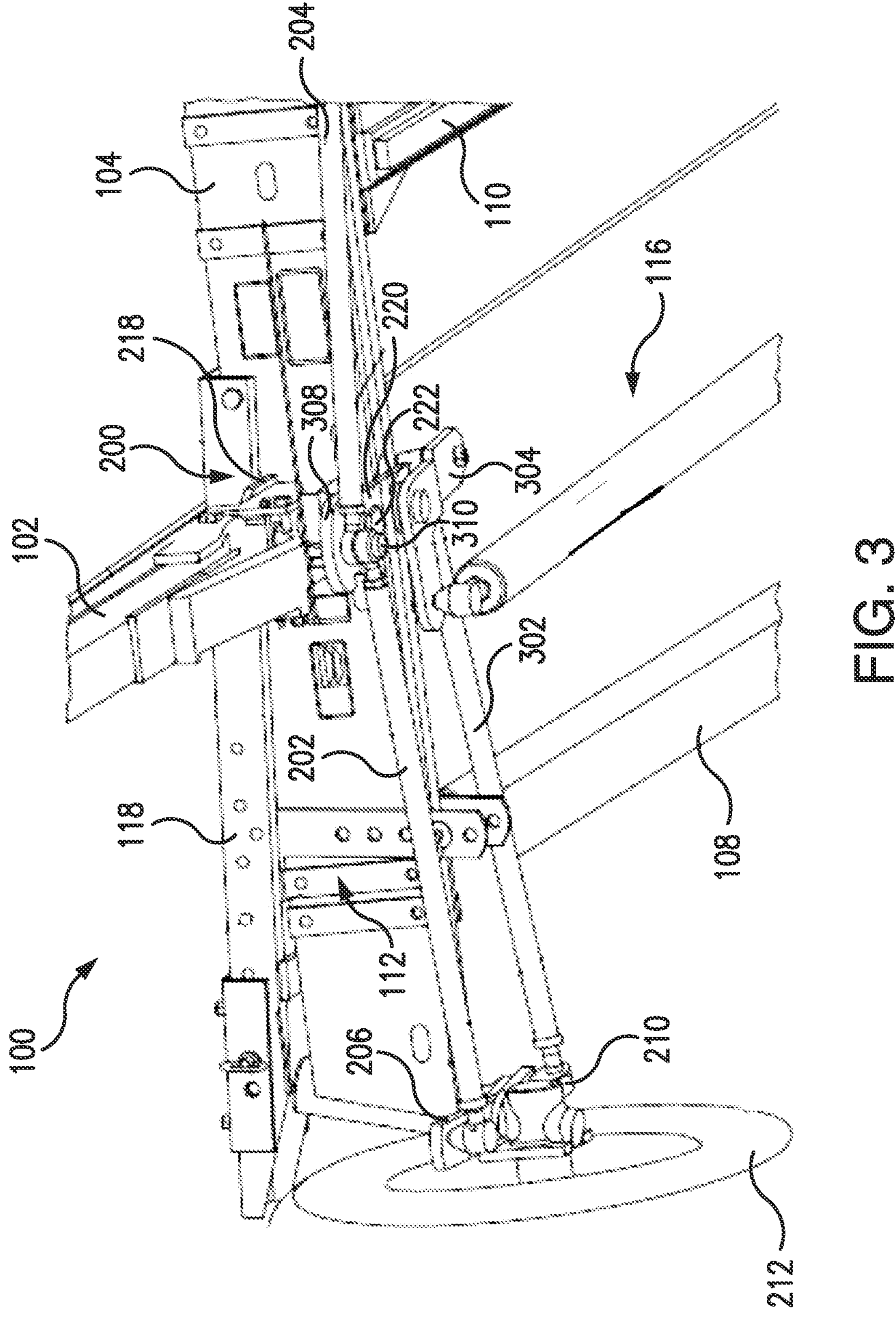
FIG. 3 is a perspective view of the bottom of the front steering linkage of a header transport according to an embodiment of the present invention.

FIG. 3 illustrates a bottom perspective view of a front steering linkage of a transport header according to an embodiment of the present invention. As shown, the tongue 102 is in the neutral position, approximately perpendicular to the front face of the front support beam 104. The front portion of the front-to-rear connecting linkage or the front-to-rear connecting link 116 is shown. The front-to-rear connecting link 116 can mechanically connect the front steering linkage 112 to the rear steering linkage 114. The front-to-rear connecting link 116 translates the oscillation of the front wheels 212 and 216 caused by the front steering linkage 112 to the rear steering linkage 114. The rear steering linkage 114 is adapted to cause the rear wheels 651, 652, 653, and 654 (See FIG. 8) to oscillate in response to the movement of the front-to-rear connecting link 116. In an embodiment of the present invention, the front-to-rear connecting link 116 is adjustable so that the rear wheels 651, 652, 653, and 654 can oscillate at various ratios relative to the oscillation of the front wheels 212 and 216.

Figure 8:
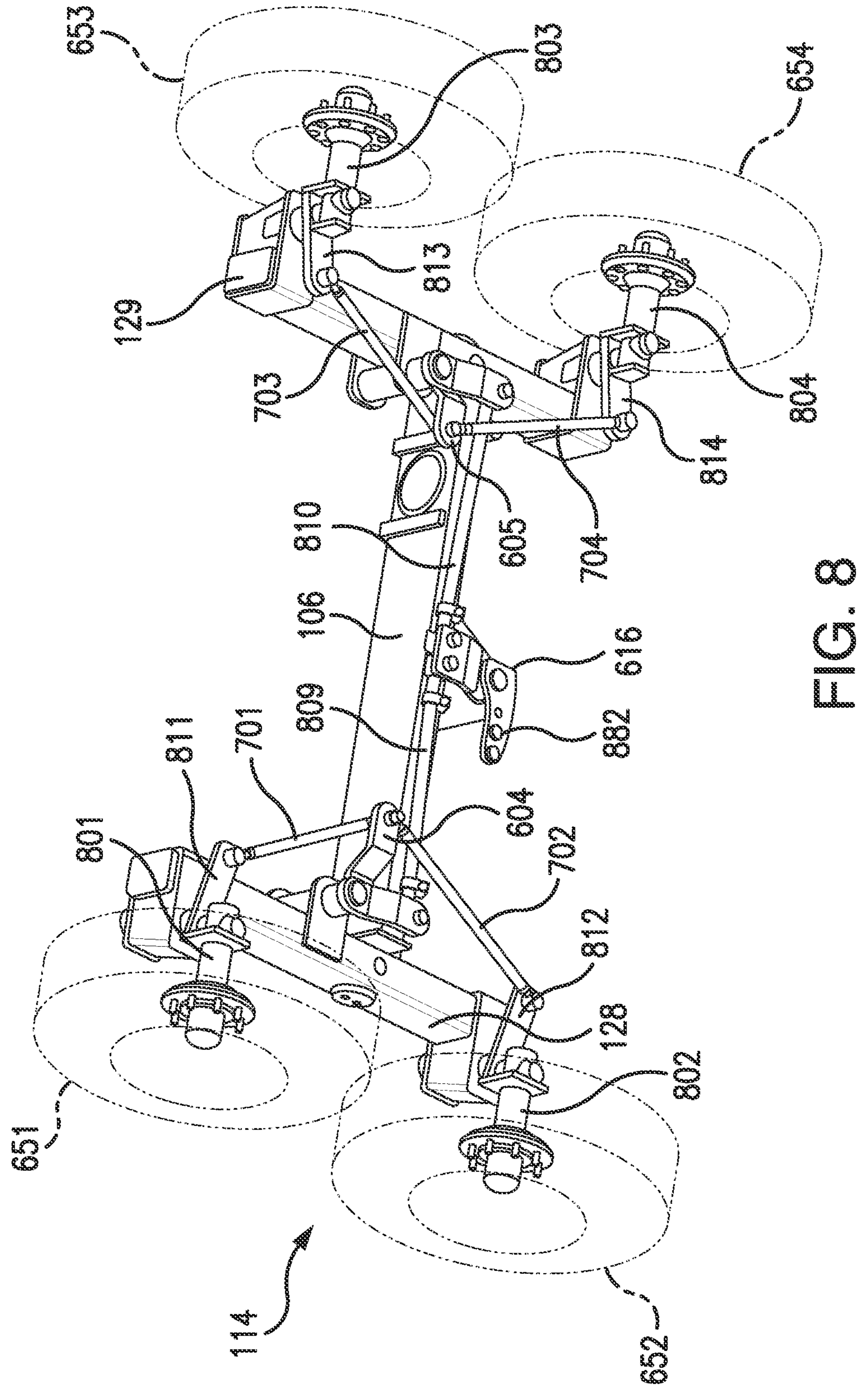
FIG. 8 is a perspective view of the bottom of the rear steering linkage of a header transport according to an embodiment of the present invention.

The front-to-rear connecting link 116 includes a front connecting link 302, a front connecting coupling 304, a rear connecting coupling 616 (See FIG. 6), and rear center connecting links 809, 810 (See FIG. 8). One of the front wheel couplings, in this case, the front right wheel coupling 206, can be coupled to the front connecting link 302. The front connecting link 302 can be coupled to the front connecting coupling 304. The front connecting coupling 304 can be coupled to the front-to-rear connecting link 116. The front-to-rear connecting link 116 can be coupled to the rear connecting coupling 616. The front-to-rear connecting link 116 translates movement in the front steering linkage 112 to the rear steering linkage 114. In an embodiment of the present invention, the front connecting coupling 304 is approximately L-shaped with the front connecting link 302 coupled to one end and the front-to-rear connecting link 116 coupled to the opposite end.

In an embodiment of the present invention, the tongue 102 can include a lip 308 that extends beyond the bottom protrusion 220 of the front support beam 104 and a protrusion 310 that extends outwardly from the lip 308 towards the ground. In an embodiment of the present invention, the front right link 202 and the front left link 204 can be rotatably coupled to the protrusion 310 such that, when the tongue 102 is pivoted, the front right link 202 and the front left link 204 are push or pulled by the protrusion 310.

Figure 4:
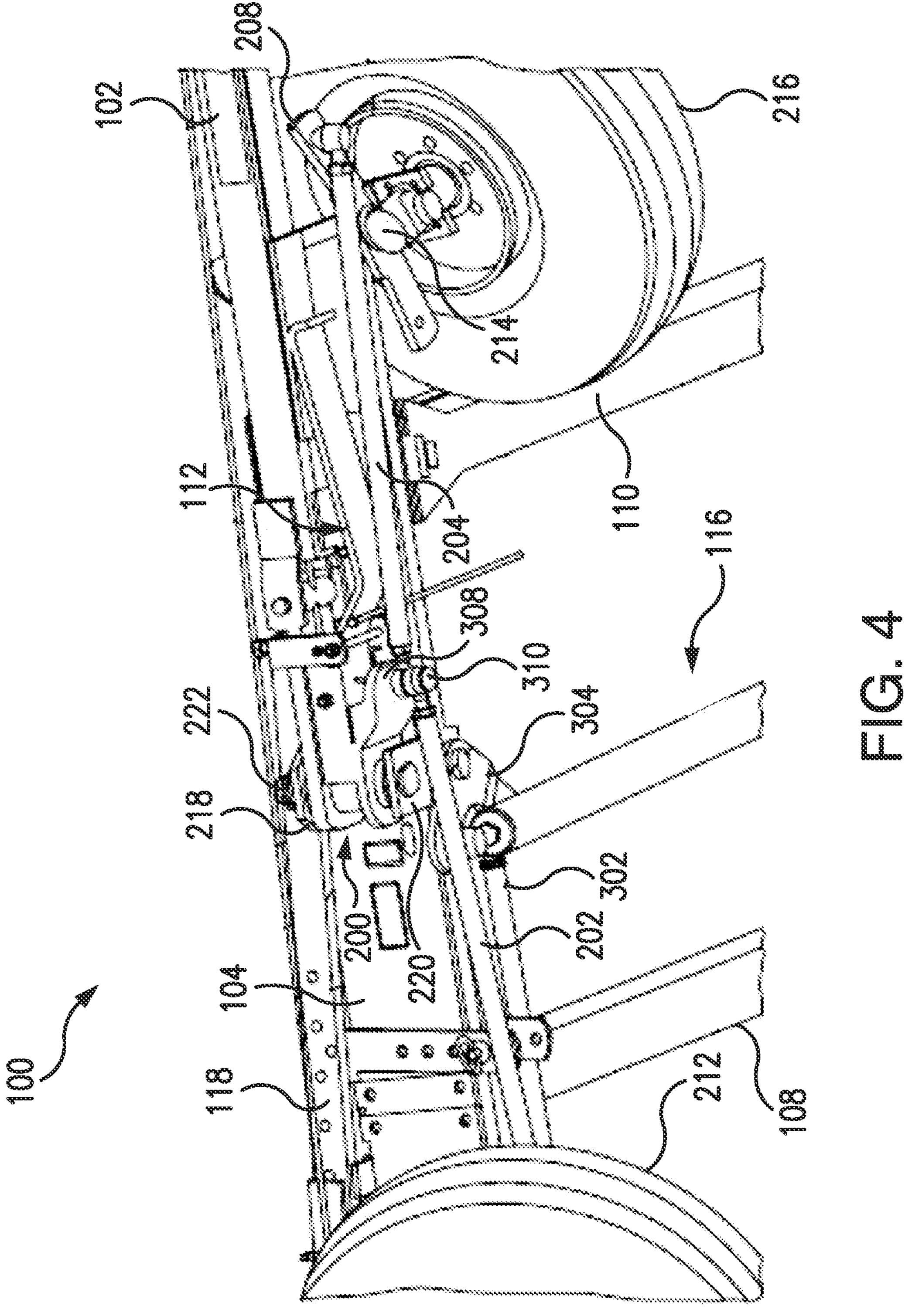
FIG. 4 is a perspective view of the bottom of the front steering linkage of a header transport turned approximately 90 degrees left according to an embodiment of the present invention.

FIG. 4 illustrates a view of the front steering linkage when the tongue 102 is turned a full 90 degrees to the left, according to an embodiment of the present invention. The tongue 102 can be made possible to turn a full 90 degrees to the side by providing extension 218 (i.e., the extension 218 protrudes outwardly from the front support beam 104 such that nothing inhibits the rotation of the tongue 102 90 degrees to either side). Further, the oscillation of the wheels 212 and 216 as the tongue 102 is pivoted allows the tongue 218 to rotate 90 degrees to either side without being inhibited by the wheels (i.e., as the tongue 102 is rotated to the left, the front left wheel 216 oscillates to the left such that the front portion of the wheel, which protrudes beyond the front support beam in a neutral position (See FIG. 2), will not block the tongue 102 from rotating 90 degrees).

According to an embodiment of the present invention, as the tongue 102 is pivoted to the left, the front steering linkage 112 drives the front wheels 212 and 216 to oscillate to the left. The tongue 102 rotates about the pivot 200 to the left, and, as the tongue 102 rotates, the front right link 202 is pulled to the left and the front left link 204 is pushed to the left. As the front left link 204 is pushed to the left, the front portion of the front left coupling 208 is rotated to the left. The rotation of the front left coupling 208 drives the front left wheel 216 to oscillate into a left turn position. As the front right link 202 is pulled to the left, the front portion of the front right coupling 206 (not shown) is rotated to the left, and the front right wheel 212 is oscillated into a left turn position. The front-to-rear connecting link 116 translates the oscillation of the front wheels 212 and 216 to the left to the rear steering linkage 114, which causes the rear wheels 651, 652, 653, 654 to oscillate. The rotation of the front right coupling 206 drives the front connecting link 302 towards the right, and this causes the front connecting coupling 304 to rotate in the direction of the pulling. The rotation of the front connecting coupling 304 drives the front-to-rear connecting link 116 towards the front of the header transport, and this causes the front-to-rear connecting link 116 to rotate the rear connecting coupling 616 (See FIG. 6). The rotation of the rear connecting coupling 616 causes the rear steering linkage 114 to turn the rear wheels.

Figure 5:
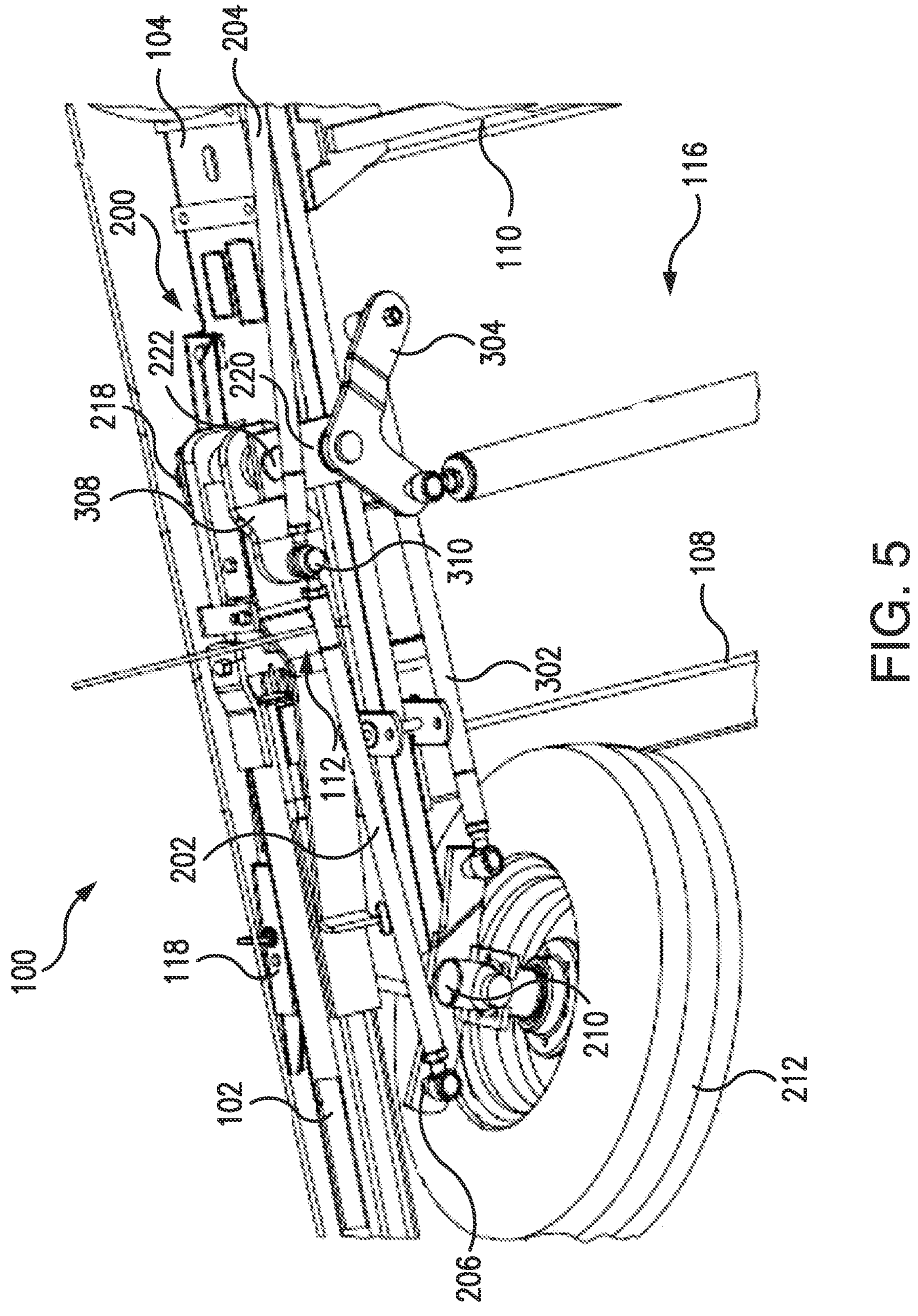
FIG. 5 is a perspective view of the bottom of the front steering linkage of a header transport turned approximately 90 degrees right according to an embodiment of the present invention.

FIG. 5 illustrates a view of the front steering linkage when the tongue 102 is turned a full 90 degrees to the right, according to an embodiment of the present invention. As discussed above, the tongue 102 is able to turn a full 90 degrees to the side because of the configuration of the extension 218 and the oscillation of the front wheels 212 and 216. The front right wheel 212 oscillates to the right such that the front portion of the wheel, which protrudes beyond the front support beam in a neutral position (See FIG. 2), will not block the tongue 102 from rotating 90 degrees.

According to an embodiment of the present invention, as the tongue 102 is pivoted to the right, the front steering linkage 112 drives the front wheels 212 and 216 to oscillate to the right. As the tongue 102 is rotated, the front right link 202 is pushed to the right and the front left link 204 is pulled to the right. As the front left link 204 is pulled to the right, the front portion of the front left coupling 208 (not shown) is rotated to the right. The rotation of the front left coupling 208 drives the front left wheel 216 (not shown) to oscillate into a right turn position. As the front right link 202 is pushed to the right, the front portion of the front right coupling 206 is rotated to the right, and the front right wheel 212 is oscillated into a right turn position. The rotation of the front right coupling 206 drives the front connecting link 302 towards the left, and this causes the front connecting coupling 304 to rotate in the direction of the pushing. The rotation of the front connecting coupling 304 drives the front-to-rear connecting link 116 towards the rear of the header transport, and this causes the connecting link to rotate the rear connecting coupling 616 (See FIG. 6).

Figure 6:
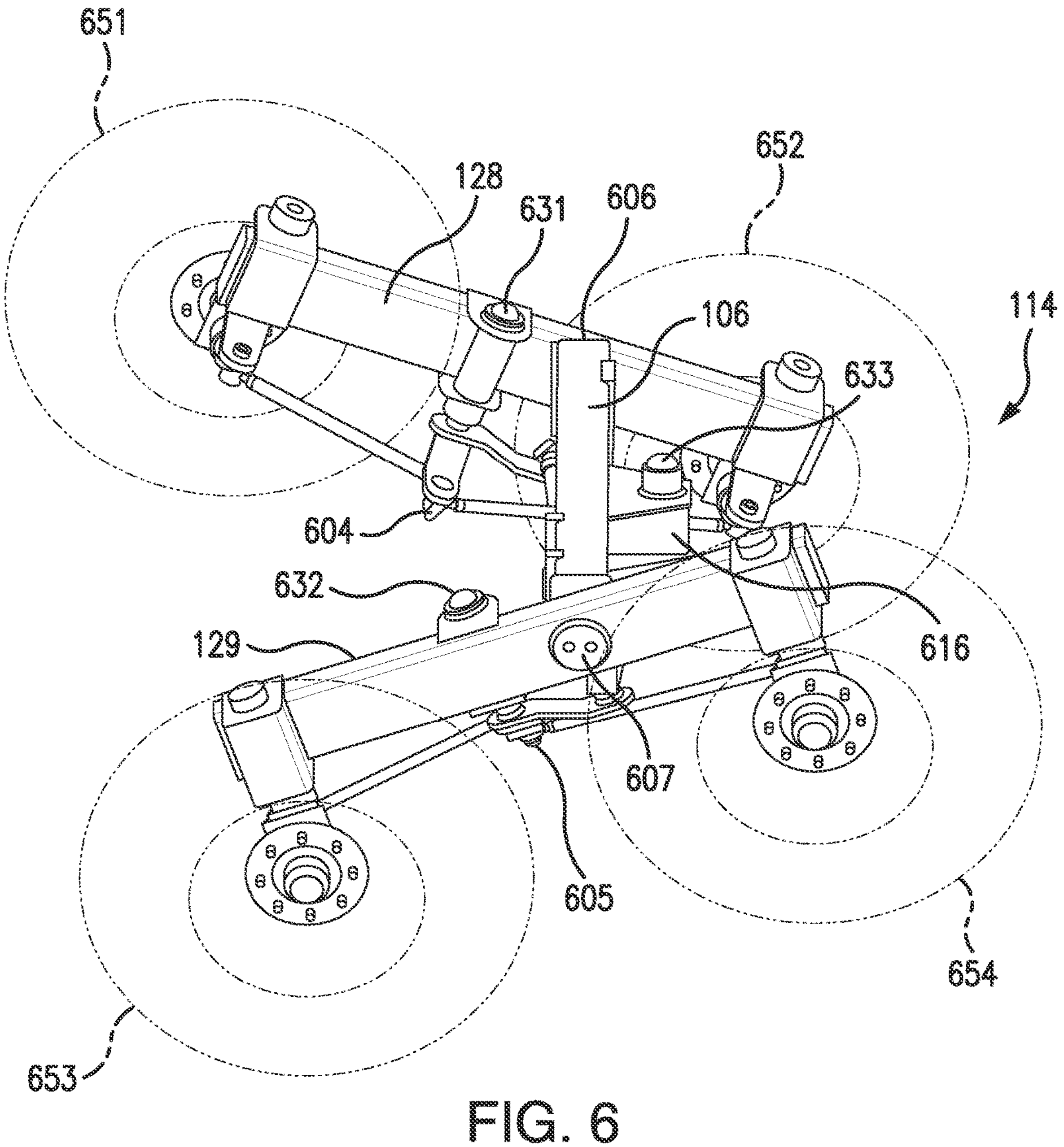
FIG. 6 is a perspective view of the rear steering linkage of a header transport according to an embodiment of the present invention, wherein the right and left header transport beams are not aligned with one another.

FIG. 6 illustrates a side view of the rear steering system with walking tandem beams pivoted in opposing directions according to an embodiment of the present invention. The header transport system includes a first walking tandem beam 128 and a second walking beam 129. The two walking tandem beams 128 and 129 are attached to the ends of the rear support beam 106 at rear beam couplings 606 and 607. The rear beam couplings 606 and 607 are composed so that the walking tandem beams 128 and 129 may independently rotate in relation to the rear support beam 106. The pivot point for oscillation of the walking tandem beams is favored, but not limited, toward the rear of the walking tandem beams, which delivers a slightly higher weight to the rear wheel.

The first walking tandem beam 128 is coupled to rear wheels 651 and 652. Similarly, the second walking tandem beam 129 is coupled to rear wheels 653 and 654. The rotation of the first walking tandem beam 128 results in the change of height of rear wheels 651 and 652. The rotation of the second walking tandem beam 129 results in the change of height of rear wheels 653 and 654.

The first walking tandem beam 128 includes a rear coupling 604 that is attached via a pivot 631. The pivot 631 allows for the rear coupling 604 to rotate about a vertical axis with respect to the first walking tandem beam 128. The second walking tandem beam 129 has a rear coupling 605 that is attached via a pivot 632. The pivot 632 allows for the rotation of the rear coupling 605 about a vertical axis with respect to the second walking tandem beam 129. The rear support beam 106 has a rear connecting coupling 616 that is attached via pivot 633. (See FIG. 9). The pivot 633 allows the rear connecting coupling 616 to rotate about a vertical axis with respect to the rear support beam 106.

Figure 7:
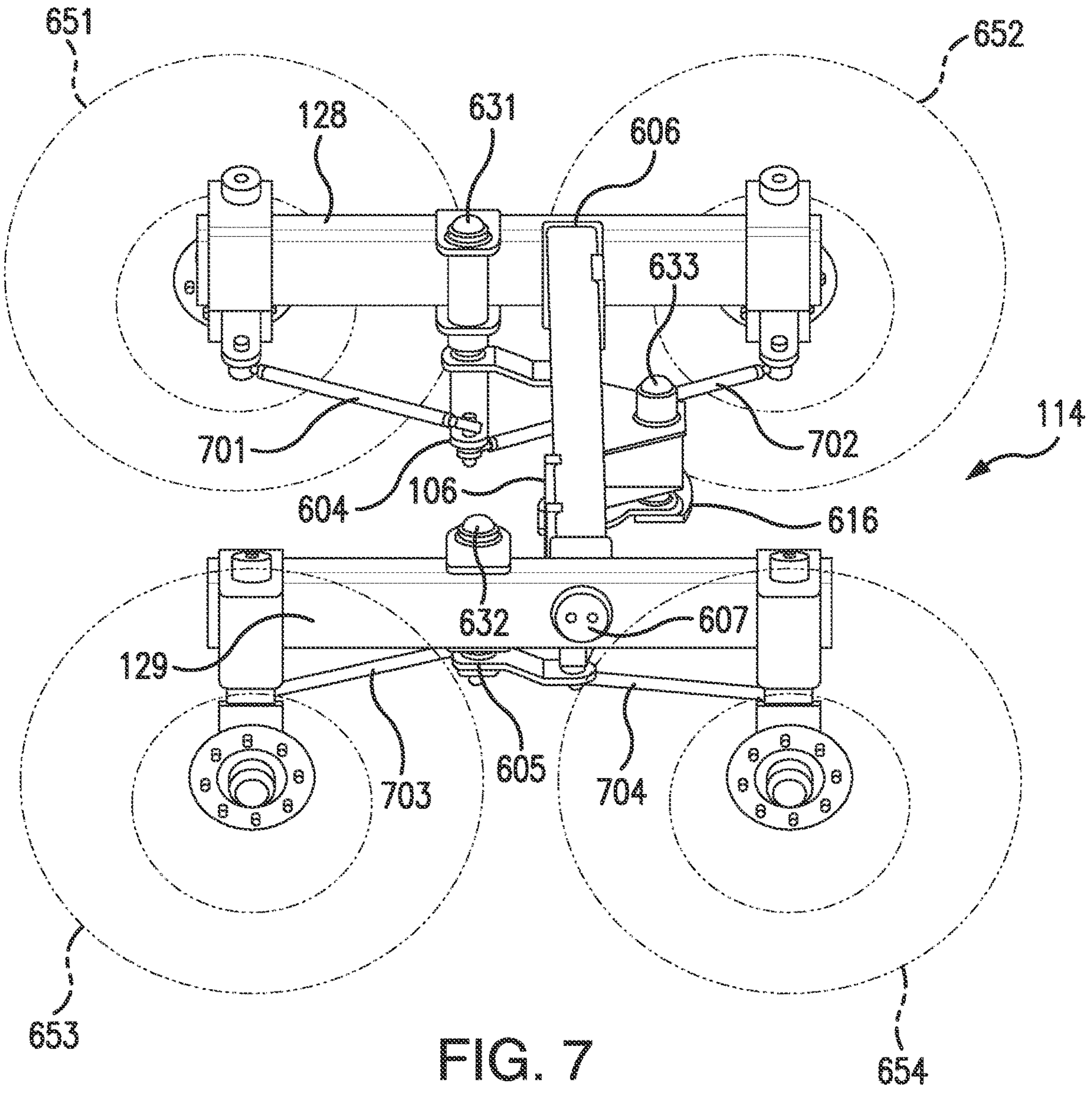
FIG. 7 is a perspective view of the rear steering linkage of a header transport according to an embodiment of the present invention, wherein the right and left header transport beams are approximately aligned with one another.

FIG. 7 illustrates a side view of the rear steering system with walking tandem beams pivoted in approximately the same position according to an embodiment of the invention. The rear steering system includes a first rear connecting link 701, a second rear connecting link 702, a third rear connecting link 703, and a fourth rear connecting link 704. The first connecting link 701 is connected to the first coupling 604, and the second rear connecting link 702 is also attached to the first rear coupling 604. The third rear connecting link 703 is connected to the second rear coupling 605, and the fourth rear connecting link 704 is connected to the second rear coupling 605. The fourth rear connecting link 704 is connected to the second rear coupling 605. The rotation of the first rear coupling 604 causes the first and second rear connecting links 701 and 702 to rotate, and the rotation of the second coupling 605 causes the third and fourth rear connecting links 703 and 704 to rotate.

Figure 9:
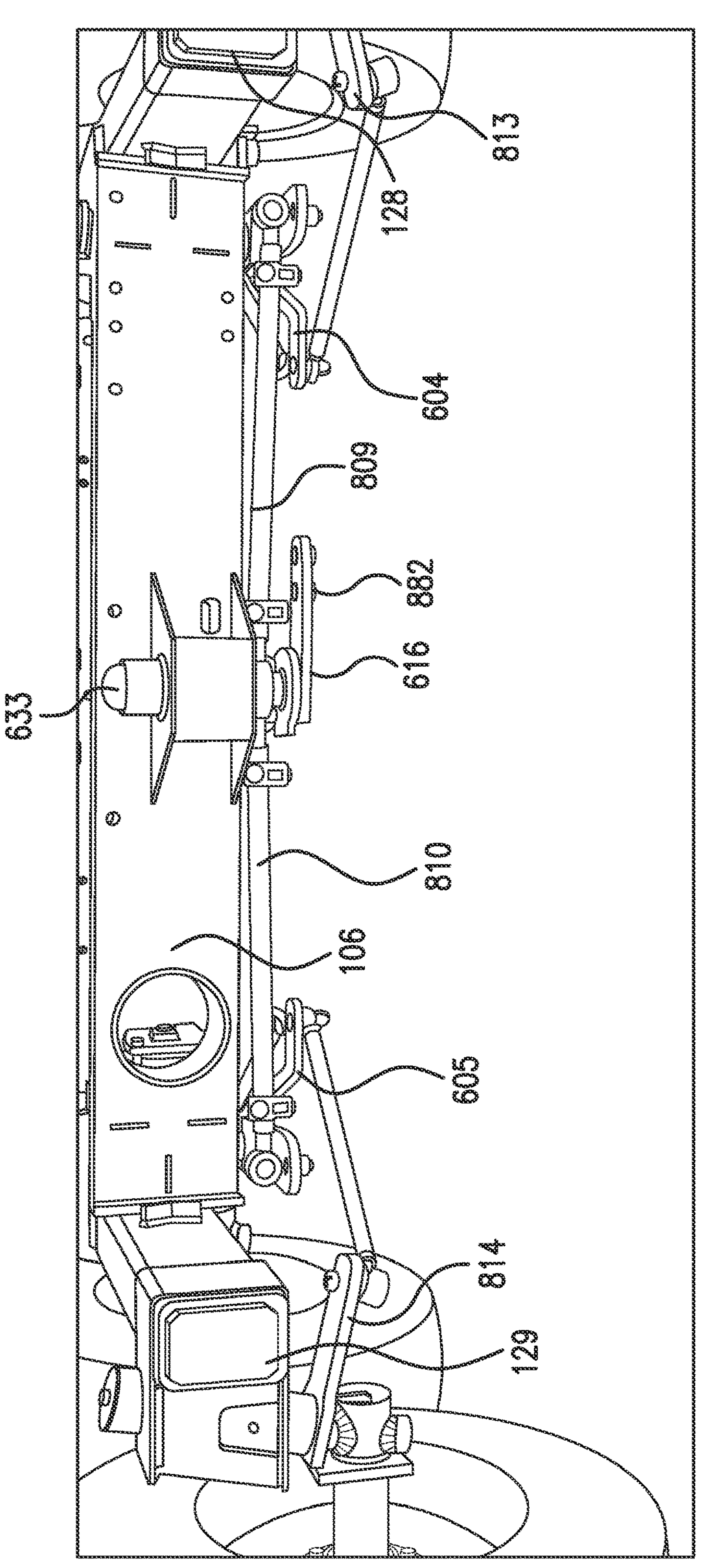
FIG. 9 is a perspective view of the rear support beam of the rear steering linkage of a header transport according to an embodiment of the present invention.

FIGS. 8 and 9 illustrate a bottom view of the rear steering system of the header transport according to an embodiment of the invention. The embodiment contains a first rear wheel axle 801, a second rear wheel axle 802, a third rear wheel axle 803, and a fourth rear wheel axle 804. The first rear wheel axle 801 couples the first rear wheel 651 to the first walking tandem beam 128. The second rear wheel axle 802 couples the second rear wheel 652 to the first walking tandem beam 128. The third rear wheel axle 803 couples the third rear wheel 653 to second walking tandem beam 129. Lastly, the fourth rear axle 804 couples the fourth rear wheel 654 to the second walking tandem beam 129.

The first rear wheel axle 801 contains a first rear wheel coupling 811. The second rear wheel axle 802 contains a second rear wheel coupling 812. The third rear wheel axel 803 contains a third rear wheel coupling 813, and the fourth rear wheel axel 804 contains a fourth rear wheel coupling 814.

The first rear wheel coupling 811 is coupled with the first rear connecting link 701. The second rear wheel coupling 812 is coupled with the second rear connecting link 702. The third rear wheel coupling 813 is coupled with the third rear connecting link 703. The fourth rear wheel coupling 814 is coupled with the fourth rear connecting link 704. The rotation of the first rear connecting link 701 causes the rotation of the first rear wheel 651. The rotation of the second rear connecting link 702 causes the rotation of the second rear wheel 652. The rotation of the third rear connecting link 703 causes the rotation of the third rear wheel 653, and the rotation of the fourth rear connecting link 704 causes the rotation of the fourth rear wheel 654.

The rear steering system of FIGS. 8 and 9 includes a first rear center connecting link 809 and a second rear center connecting link 810. The first rear center connecting link 809 is connected to the rear connecting coupling 616 and the first rear coupling 604. The second rear connecting link 810 is connected to the second rear coupling 605 and the rear connecting coupling 616.

The rear connecting coupling 616 includes a front-to-rear rod attachment point 882. A front-to-rear connecting link 116 can be attached to the front-to-rear rod attachment point 882. The rotation of tongue 102 can cause the rotation of the front-to-rear connecting link 116. The rotation of the front-to-rear connecting link 116 can cause the rotation of the rear connecting coupling 616. The rotation of the rear connecting coupling 616 can cause the rotation of the first rear center connecting link 809 and the second rear center connecting link 810. The rotation of the rear center connecting links 809 and 810 rotates the first rear coupling 604 and the second rear coupling 605, respectively. The rotation of the first rear coupling 604 rotates the first rear connecting link 701 and second rear connecting link 702, while the rotation of the second rear coupling 605 causes the third rear connecting link 703 and the fourth rear connecting link 704 to rotate. The rotation of the rear connecting links 701, 702, 703, and 704 causes the respective rear wheel couplings 811, 812, 813, and 814 to rotate. The rotation of rear wheel couplings 811, 812, 813, and 814 causes the rear wheel axles 801, 802, 803, and 804 to rotate. The rotation of rear wheel axles 801, 802, 803, and 804 causes the rotation of rear wheels 651, 652, 653, and 654.

In certain embodiments, the first rear coupling 604, second rear coupling 605, and rear connecting coupling 616 can be configured such that the rear wheels 651, 652, 653, and 654 rotate in the opposite direction of the front wheels 212 and 216.

While certain embodiments of the present invention include a header transport with walking tandem beams located on the rear of the device, the present invention includes a header transport with walking tandem beams also located on the front of the device. In certain embodiments, the walking tandem beams on the front of the device have the same structure and function as the walking tandem beams located on the rear of the device.

Figure 10:
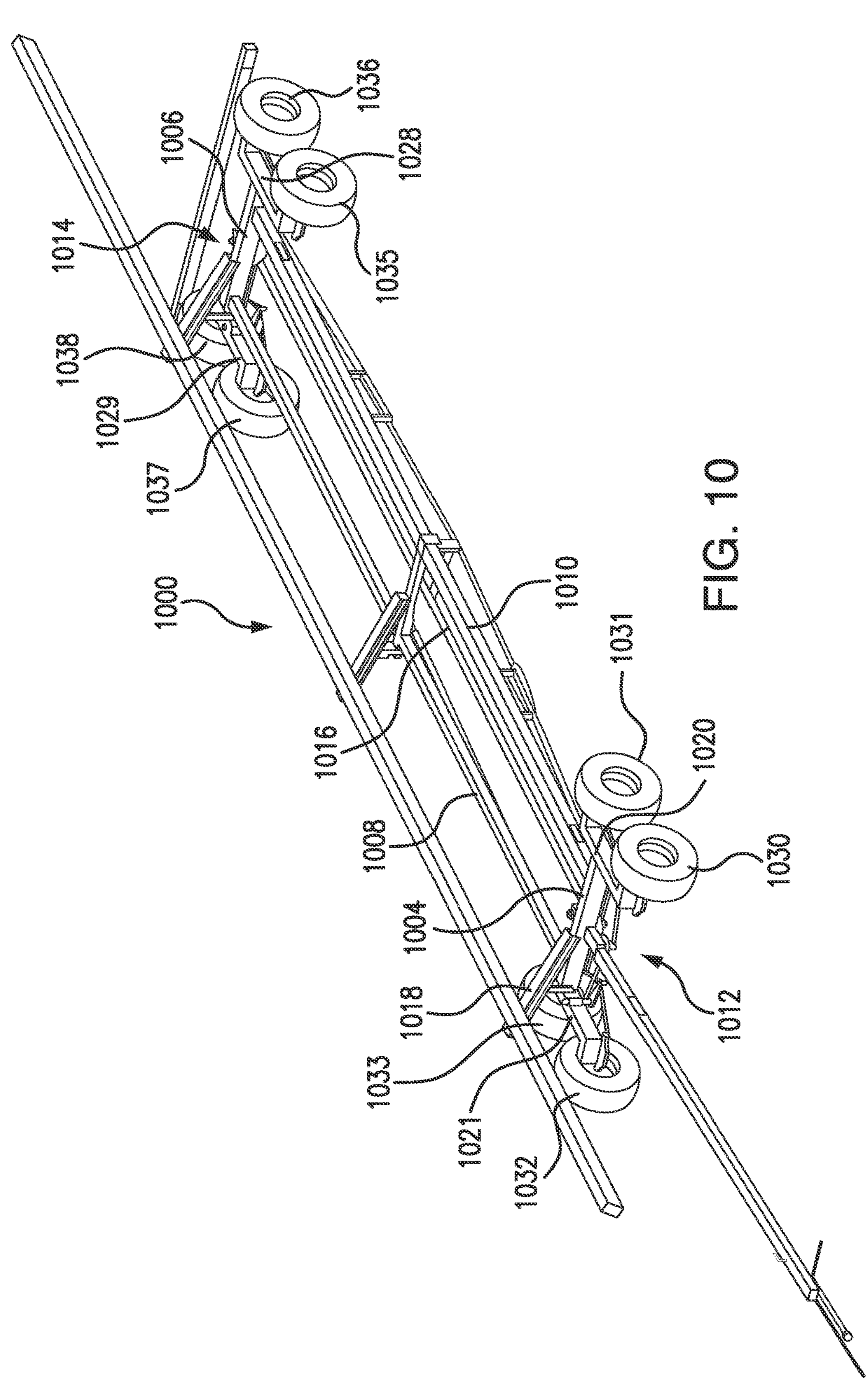
FIG. 10 is a top view of a header transport according to an embodiment of the present invention.

FIG. 10 is a top view of a header transport with an all-wheel 180-degree steering system according to an embodiment of the present invention. The header transport 1000 includes a support frame formed by a front support beam 1004, a rear support beam 1006 and side support beams 1008 and 1010. The frame beams can be connected by connecting means such as, for example, by bolts or welding. The header transport is a multi-wheel transport and wheels can be provided, for example, at the ends of beams—e.g., front support beam 1004. The plurality of wheels are turnable and can be rotatably coupled to the frame. The header transport includes a front steering linkage 1012, a rear steering linkage 1014 and a front-to-rear connecting link 1016. A tongue can be pivotably coupled to the front support beam 1004. In an embodiment, the linkages are mechanically coupled with the tongue so that movement of the tongue controls the oscillation (rotation) of the wheels of the header transport. The header transport includes a front support beam 1004 connected to two front walking tandem beams 1020 and 1021. Wheels 1030 and 1031 are connected to a first front walking tandem beam 1020, and wheels 1032 and 1033 are connected to a second front walking tandem beam 1021. The header transport further includes a rear support beam 1006 connected to two rear walking tandem beams 1028 and 1029. Wheels 1035 and 1036 are connected to a first rear walking tandem beam 1028, and wheels 1037 and 1038 are connected to a second rear walking tandem beam 1029.

In an embodiment of the present invention, the header transport 1000 includes a front rest bracket 1018. The front rest bracket 1018 is coupled to the front support beam 1004. The rest bracket 1018 is configured to support a large object to be transported, such as a header or grain platform. In an embodiment of the present invention, front rest bracket 1018 can be adjustable such that the angle of the rest bracket 1018 relative to the support beam to which it is coupled can be changed. A rear rest bracket may be added to the rear support beam 1006 in a manner allowing the rear rest bracket to have similar functionality as the front rest bracket 1018.

In certain embodiments, the walking tandem beams on the front of the device have the same structure and function as the walking tandem beams located on the rear of the device. For example, the front walking tandem beams can have the same structure and function described with respect to FIGS. 6, 7, 8, and 9.

Thus, a number of preferred embodiments have been fully described above with reference to the drawing figures. Although the invention has been described based upon these preferred embodiments, it would be apparent to those of skill in the art that certain modifications, variations, and alternative constructions could be made to the described embodiments within the spirit and scope of the invention. For example, the steering system could be used on any farm implement that is towed.

We claim:

1. A header transport steering system comprising:

a frame comprising a front support beam and a rear support beam;

a tongue pivotably coupled to said front support beam of said frame such that said tongue is capable of rotating about a coupling;

a plurality of front wheels coupled with said frame;

a plurality of rear wheels coupled with said frame;

a front steering linkage coupled to said tongue and configured to oscillate said plurality of front wheels in response to rotation of said tongue;

a plurality of walking tandem beams coupled to said rear support beam and configured to rotate in relation to said rear support beam;

a front-to-rear linkage coupled to said front steering linkage and said rear support beam; and a plurality of rear connecting links coupled to at least one of said walking tandem beams, wherein each rear connecting link is configured to rotate in relation to said walking tandem beam, wherein each walking tandem beam is configured to rotate independently in relation to said rear support beam.

2. The header transport steering system of claim 1, wherein each rear connecting link is configured to rotate independently in relation to said walking tandem beam.

3. The header transport steering system of claim 1, wherein said tongue is capable of rotating approximately 180 degrees about said point of coupling.

4. The header transport steering system of claim 1, wherein said system comprises at least two front wheels.

5. The header transport steering system of claim 1, wherein said system comprises four rear wheels and two walking tandem beams.

6. The header transport steering system of claim 5, wherein a first and a second of said four rear wheels are connected to a first walking tandem beam and a third and a fourth of said four rear wheels are connected to a second walking tandem beam.

7. The header transport steering system of claim 6, further comprising:

a first axle connecting said first wheel to said first walking tandem beam;

a second axle connecting said second wheel to said first walking tandem beam;

a third axle connecting said third wheel to said second walking tandem beam; and a fourth axle connecting said fourth wheel to said second walking tandem beam.

8. The header transport steering system of claim 7, wherein said plurality of rear connecting links comprises a first, a second, a third, and a fourth rear connecting link; and wherein said first rear connecting link connects said first axle to a first coupling;

wherein said second rear connecting link connects said second axle to said first coupling; wherein said third rear connecting link connects said third axle to a second coupling; and wherein said fourth rear connecting link connects said fourth axle to said second coupling.

9. The header transport steering system of claim 8, further comprising:

a first rear center link connecting said first coupling to said rear support beam; and a second rear center link connecting said second coupling to said rear support beam.

10. The header transport steering system of claim 1, wherein said plurality of walking tandem beams rotate about a generally horizontal axis of rotation in relation to said rear support beam.

11. The header transport steering system of claim 10, wherein said rotation of said plurality of walking tandem beams results in a change in height of said rear wheels.

12. The header transport steering system of claim 1, wherein said plurality of rear connecting links rotate about a generally vertical axis of rotation in relation to said walking tandem beam.

13. The header transport steering system of claim 12, wherein said rotation of said rear connecting links results in rotation of said rear tires.

14. The header transport steering system of claim 2, wherein said front-to-rear linkage is configured to oscillate said rear wheels in an opposite direction of said front wheels.

15. A header transport steering system comprising:

a frame comprising a front support beam and a rear support beam;

a tongue pivotably coupled to said front support beam of said frame such that said tongue is capable of rotating about a coupling;

a plurality of front wheels coupled with said frame;

a plurality of rear wheels coupled with said frame;

a front steering linkage coupled to said tongue and configured to oscillate said plurality of front wheels in response to rotation of said tongue;

a plurality of walking tandem beams coupled to said rear support beam and configured to rotate in relation to said rear support beam;

a front-to-rear linkage coupled to said front steering linkage and said rear support beam; and a plurality of rear connecting links coupled to at least one of said walking tandem beams, wherein each rear connecting link is configured to rotate in relation to said walking tandem beam, wherein the walking tandem beams are coupled to the rear beam support at a location closer to the rear of the walking tandem beam relative to a center of gravity of the walking tandem beam.

* * * * *